United States Patent
Kirchner

(10) Patent No.: US 8,529,402 B2
(45) Date of Patent: Sep. 10, 2013

(54) PUMP ARRANGEMENT

(75) Inventor: Eckhard Kirchner, Ginsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 12/910,381

(22) Filed: Oct. 22, 2010

(65) Prior Publication Data
US 2011/0120250 A1    May 26, 2011

(30) Foreign Application Priority Data
Oct. 22, 2009    (GB) .................................. 0918529.9

(51) Int. Cl.
*F16H 61/38*    (2006.01)

(52) U.S. Cl.
USPC ................ 477/52; 477/68; 184/26; 184/27.2; 417/286; 417/287

(58) Field of Classification Search
USPC ............... 477/52, 68; 417/286, 287; 184/26, 184/27.1, 27.2
See application file for complete search history.

(56) References Cited

U.S. PATENT DOCUMENTS

| | | | |
|---|---|---|---|
| 6,196,806 B1 * | 3/2001 | Van Der Sluis | 417/62 |
| 6,848,548 B2 * | 2/2005 | Alfredsson | 192/3.25 |
| 2008/0078173 A1 | 4/2008 | Cronin et al. | |
| 2009/0232673 A1 | 9/2009 | Reisch et al. | |
| 2010/0322791 A1 * | 12/2010 | Wadsley et al. | 417/286 |

FOREIGN PATENT DOCUMENTS

| | | | |
|---|---|---|---|
| DE | 102004058261 A1 | | 6/2006 |
| JP | 2009052639 A | * | 3/2009 |
| WO | WO 2005068849 A1 | * | 7/2005 |

OTHER PUBLICATIONS

Machine translation of JP2009052639 dated Dec. 14, 2012.*

* cited by examiner

*Primary Examiner* — Tisha Lewis
(74) *Attorney, Agent, or Firm* — Ingrassia Fisher & Lorenz, P.C.

(57) ABSTRACT

A pump arrangement for fluid in an automotive transmission system includes, but is not limited to a first, low-pressure pump stage and a second, high-pressure pump stage, the first pump stage supplying low-pressure fluid to a lubrication/cooling system and to the inlet of second pump stage, which supplies high pressure fluid to a hydraulic control system. Fluid from both systems is returned via a reservoir and filter to the first pump stage.

20 Claims, 1 Drawing Sheet

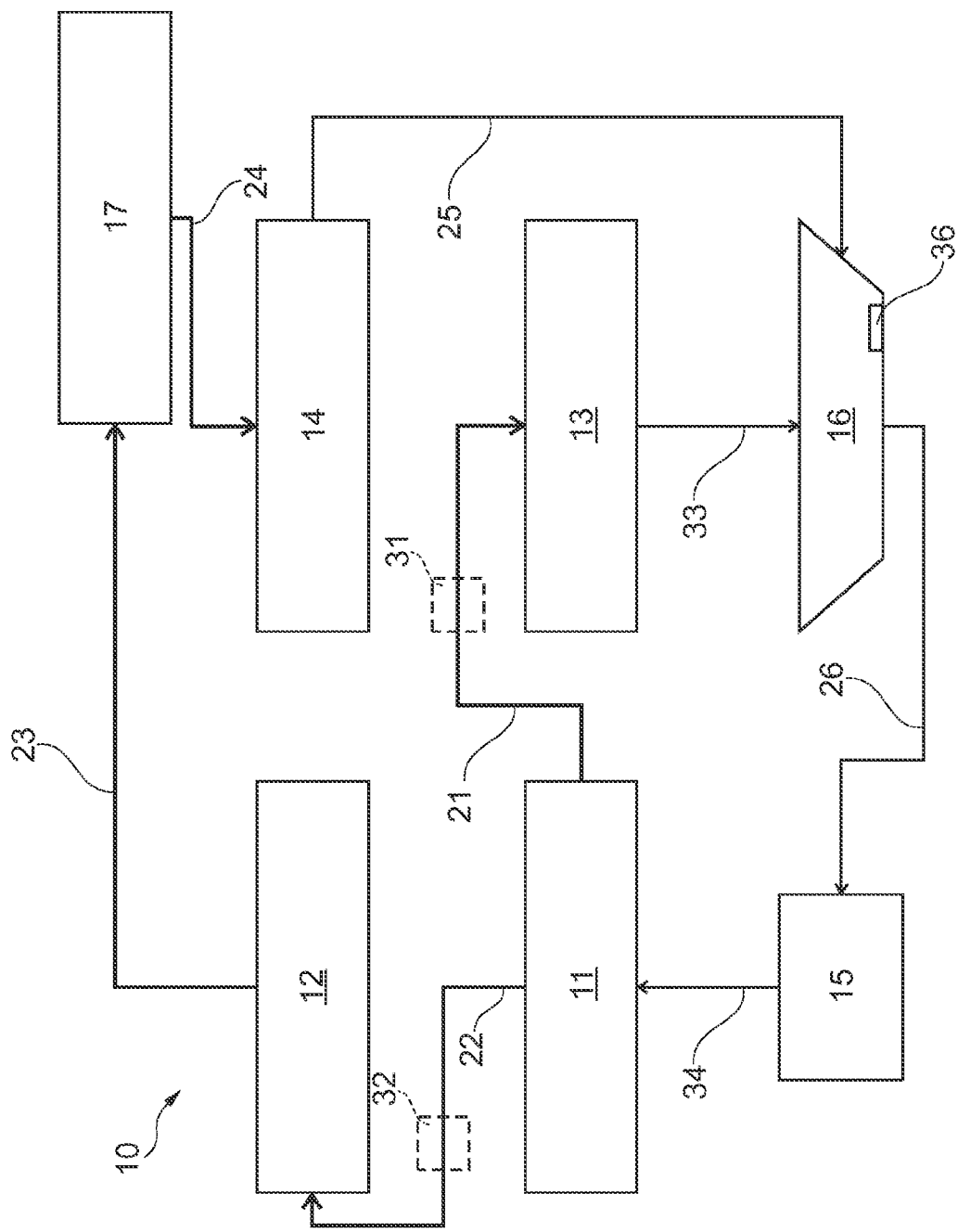

PUMP ARRANGEMENT

CROSS-REFERENCE TO RELATED APPLICATION

This application claims priority to British Patent Application No. 0918529.9, filed Oct. 22, 2009, which is incorporated herein by reference in its entirety.

TECHNICAL FIELD

The technical field relates to pump arrangements and in particular to a pump arrangement with two stages for use in automotive transmission systems, in particular automatic or dual clutch transmissions with hydraulic actuation elements.

BACKGROUND

At present automatic transmission systems employ a single oil pump with constant displacement which is driven by the vehicle's combustion engine in proportion to the engine speed. The oil flow at high pressure is used for both lubrication and cooling of the gear train and the torque converter as well as for actuation of various brakes, clutches and shift elements. The constant dependency of the pump operation mode on the combustion engine speed makes this transmission type comparatively inefficient when it comes to the actuation and lubrication losses. For dual clutch transmission systems the lubrication and cooling of the gear train is often realized by an oil-sump based splash-lubrication arrangement. For wet dual clutch transmission systems quite often a volume fraction is taken out of the high pressure actuation circuit and fed to the gear meshes, bearings and synchronizers. All hydraulically actuated dual clutch systems have either a permanently running oil pump or an electrically driven pump.

The transmission systems discussed above have the disadvantage of splash and churning losses due to full or partial submersion of the gears in transmission lubricant fluid. In both automatic planetary-based and dual clutch transmission systems the permanent operation of a pump at a relatively high pressure results in oil leakage which needs to be compensated by respective re-charging. These losses in the actuation and lubrication systems are known as parasitic losses.

In view of the foregoing, it is desirable to overcome or reduce one or more of the above disadvantages. In addition, other desirable features and characteristics will become apparent from the subsequent summary and detailed description, and the appended claims, taken in conjunction with the accompanying drawings and this background.

SUMMARY

According to a first embodiment of the present invention, there is provided a pump arrangement comprising a first pump stage and a second pump stage, the first stage supplying a fluid at a relatively low pressure to a first consuming system and to the second stage, and the second stage raising the pressure of the fluid received from the first stage and supplying the fluid at a relatively high pressure to a second consuming system.

The above arrangement has the advantage of reducing so-called parasitic losses. During the operation of any fluidic pumping system, fluid is lost by evaporation and leaks. Examples of such systems are those for circulating transmission oil, lubricating oil and coolant in automotive engines. The rate of loss of fluid increases with the volume of fluid in the system, pressure and the period of use. Accordingly, instead of using high pressure fluid for all purposes, arrangements according to the present invention use low pressure fluid where possible and only produce and use a suitable low volume of fluid at high pressure as and when required. This also saves energy, since it saves the extra amount of energy needed to produce inessential amounts of fluid at high pressure.

According to a second embodiment of the present invention, there is provided a multiple-stage pump arrangement for supplying fluid at a relatively high pressure to a hydraulic circuit and comprising at least first and second pump stages, the first pump stage being arranged to supply fluid at a relatively low pressure to the second stage, and the second stage being arranged to supply fluid at the relatively high pressure to the hydraulic circuit, wherein the first stage is also arranged to supply fluid at a relatively low pressure to a separate circuit.

According to a third embodiment of the present invention, there is provided an automotive transmission system comprising one or more gear components and at least one lubrication and/or coolant circuit therefore, one or more hydraulically-operated shift elements and at least one hydraulic circuit for the circulation of hydraulic fluid therefore, a first pumping stage arranged to supply fluid at a relatively low pressure to the lubrication and/or coolant circuit, and a second pumping stage arranged to receive fluid at a relatively low pressure from the first pumping stage and to supply fluid at a relatively high pressure to the hydraulic circuit.

According to a fourth embodiment of the present invention, there is provided a method of operating an automotive transmission system comprising at least one low pressure fluid consuming system and at least one high pressure fluid consuming system, a first pumping stage connected to the low pressure fluid consuming system, and a second pumping stage, which is connected via a switching element to an outlet of the first pumping stage to selectively receive fluid there from at low pressure and which is arranged to supply fluid at a relatively high pressure to the high pressure fluid consuming system, wherein, at times at which only the low pressure fluid consuming system requires fluid, the switching element is actuated to close the connection between the first and second pumping stage.

BRIEF DESCRIPTION OF THE DRAWINGS

The present invention will hereinafter be described in conjunction with the following drawing FIGURE that shows a pump arrangement for an automotive transmission system.

DETAILED DESCRIPTION

The following detailed description is merely exemplary in nature and is not intended to limit application and uses. Furthermore, there is no intention to be bound by any theory presented in the preceding background or summary or the following detailed description.

The expression "consuming system" used in the present specification means a system that uses the properties of the fluid, typically oil for use in lubrication and hydraulic circuits of a vehicle. Apart from minor losses, in the form of leaks etc, the consuming system does not use up the actual oil itself, but typically returns it to a reservoir or sump.

Referring now to the single FIGURE of the drawings, there is shown a schematic representation of an automotive transmission system incorporating a pumping arrangement 10 according to the present invention. The arrangement comprises a first pump 11 and a second pump 12. The first pump 11 is a high volume pump providing oil at a low to moderate pressure in a range of approximately 2 to approximately 5 bars, preferably approximately 3 to approximately 4 bars. It is driven by the internal combustion engine of the vehicle. Pump 11 supplies oil via first outlet line 21 to an active lubricant distribution system 13. This oil is used to lubricate transmission components such as gear meshes, bearings and synchronizers. After use, the lubricant passes to outlet line 33 and is collected in a reservoir or sump 16 without adding drag to the gear train.

Pump 11 also provides oil at the same pressure via a separate line 22 to the inlet of the second pump 12. The volume of oil thus supplied on line 22 is small compared to the total volume of oil passing through the first pump. The ratio of the volumes of fluid supplied to lines 22 and 21 lies in the range approximately 0.05 to approximately 0.2. Pump 12 provides oil at high pressure via a line 23 to an accumulator 17 from where it is supplied via a line 24 to a hydraulic control system 14. The high pressure preferably lies in the range of approximately 40 to approximately 60 bars, most preferably substantially approximately 50 bars. System 14 can be used to actuate components of a dual clutch transmission system or an automatic transmission system as desired. Bleeding fluid and any leaking fluid, represented by line 25, pass from system 14 to the reservoir 16.

The oil from reservoir 16 is passed via a line 26 to a separate filter 15 and from there via a line 34 to the first pump 11. The filter 15 serves to increase bearing lifetime by assisting in maintaining lower lubricant contamination levels.

An advantage of the above-described arrangement is that the parasitic losses due to lubricant drag, churning and windage remain small since the enforced lubrication of the torque transferring components only has minimum quantities of oil in permanent (static) in contact with the gear train. This is because a substantial part of the oil is at only relatively low pressure. It permits flexible operation because the parameters for the various parts of the transmission can be separately selected.

Various modifications can be made to the above-described arrangement. The first pump 11 can alternatively be driven by an electric motor. The operating parameters of the electronic motor are not selected to deliver maximum power, but to provide optional performance of the pump. In other words overall efficiency is desired rather than high speed. This is sometimes known as phlegmatized operation of the motor.

During certain periods, fluid is not required by the hydraulic control system 14. For such times, there may be provided in line 22 an on-off valve 32 which serves to shut off line 22 and thus save energy. This can lead to lower actuator losses by employing a demand dependent pump operation strategy.

The pump arrangement may be used in a wide range of automotive transmission systems in addition to automatic systems and hydraulically-operated wet or dry dual clutch systems. The pump arrangement may be used in internal combustion engine vehicles or in hybrid propulsion vehicles. Depending on the compatibility of additives and base lubricant used, the engine and transmission could both run on the low pressure circuit. Systems like variable cam phaser units using a hydraulic actuation could use the high pressure circuit. The pump arrangement may be used in a wide range of fluidic systems other than automotive transmissions. Other fluids may be employed, e.g. water or air. In certain applications, it may be desired to operate high pressure system 14 and not low pressure system 13. Accordingly, an on-off valve 31 may be provided in line 21 to shut off line 21 when desired.

One or more additional pump stages may be added to the pump arrangement shown to form a chain of pumps, with each one acting at a higher pressure than the previous one in the chain. Furthermore, the reservoir 16 can be equipped with a heating device such as a heat storage or heat exchange device to keep the fluid warm between subsequent operating cycles of the vehicle and/or to increase heat-up performance to arrive earlier at high temperature low viscosity oil.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pump arrangement, comprising:
   a first consuming system;
   a second consuming system;
   a first pump stage adapted to supplying a fluid at a relatively low pressure to the first consuming system;
   a second pump stage adapted to receive the fluid from the first pump stage at the relative low pressure, and the second pump stage further adapted to raise a pressure of the fluid received from the first pump stage and supply the fluid at a relatively high pressure to the second consuming system; and
   a switching element selectively coupling the second pump stage to an outlet of the first pump stage and configured to selectively close the coupling between the first pump stage and the second pump stage when a time is identified at which only the first consuming system is to be provided the fluid.

2. The pump arrangement according to claim 1, wherein the first consuming system is a lubricant system.

3. The pump arrangement according to claim 1, wherein the first consuming system is a coolant distribution system.

4. The pump arrangement according to claim 1, wherein the second consuming system is a hydraulic control system.

5. The pump arrangement according to claim 4, wherein the second pump stage is adapted to supply the fluid at the relatively high pressure to an accumulator, which supplies the fluid to the hydraulic control system.

6. The pump arrangement according to claim 1, further comprising a reservoir, wherein fluid from the first consuming system and the second consuming system is supplied to the reservoir, which supplies fluid to the first pump stage.

7. A multiple-stage pump arrangement for supplying fluid at a relatively high pressure to a hydraulic circuit, comprising:
   a first pump stage with a first pump;
   a second pump stage with a second pump,
   wherein the first pump is adapted to supply fluid at a relatively low pressure to the second pump, and the second pump stage is adapted to supply fluid at the relatively high pressure to the hydraulic circuit,
   wherein the first pump stage is further adapted to supply fluid at the relatively low pressure to a separate circuit; and
   a switching element selectively coupling the second pump stage to an outlet of the first pump stage and configured to selectively close the coupling between the first pump stage and the second pump stage when a time is identified at which only the separate circuit is to be provided the fluid.

8. The multiple-stage pump arrangement according to claim 7, wherein the separate circuit is a lubrication circuit.

9. The multiple-stage pump arrangement according to claim 7, wherein the separate circuit is a coolant circuit.

10. The multiple-stage pump arrangement according to claim 7, wherein fluid from the hydraulic circuit and the separate circuit is supplied to a common reservoir that supplies fluid to the first pump stage.

11. The multiple-stage pump arrangement according to claim 10, wherein the common reservoir comprises a fluid-heating device.

12. An automotive transmission system, comprising:
a gear component;
a gear component circuit adapted for the gear component;
a hydraulically-operated shift element;
a hydraulic circuit adapted to circulate hydraulic fluid;
a first pumping stage arranged to supply fluid at a relatively low pressure to the gear component circuit;
a second pumping stage arranged to receive fluid at the relatively low pressure from the first pumping stage and to supply fluid at a relatively high pressure to the hydraulic circuit; and
a switching element selectively coupling the second pumping stage to an outlet of the first pumping stage and configured to selectively close the coupling between the first pumping stage and the second pumping stage when a time is identified at which only the gear component is to be provided the fluid.

13. The automotive transmission system according to claim 12, wherein the gear component circuit is a lubrication circuit.

14. The automotive transmission system according to claim 12, wherein the gear component circuit is a coolant circuit.

15. The automotive transmission system according to claim 12, wherein the automotive transmission system is an automatic vehicle transmission system.

16. The automotive transmission system according to claim 12, wherein the automotive transmission system is a dual clutch vehicle transmission system.

17. A method of operating an automotive transmission system comprising a low pressure fluid consuming system and a high pressure fluid consuming system, a first pumping stage with a first pump connected to the low pressure fluid consuming system, and a second pumping stage with a second pump connected via a switching element to an outlet of the first pumping stage and arranged to supply fluid at a relatively high pressure to the high pressure fluid consuming system, comprising the steps of:
selectively providing, from the first pump, fluid at low pressure to an inlet of the second pump;
identifying a time at which only the low pressure fluid consuming system is to be provided fluid; and
actuating the switching element to close a connection between the first pump and the second pump when the time is identified at which only the low pressure fluid consuming system is to be provided fluid.

18. The method according to claim 17, wherein the switching element is an on-off valve.

19. The method according to claim 17, wherein the low pressure fluid consuming system comprises lubrication circuit and the high pressure fluid consuming system comprises a hydraulic control element.

20. The method according to claim 17, wherein the low pressure fluid consuming system comprises a cooling circuit and the high pressure fluid consuming system comprises a hydraulic control element.

* * * * *